United States Patent
Coue et al.

(10) Patent No.: US 12,312,434 B2
(45) Date of Patent: May 27, 2025

(54) TIRE COMPRISING A POLYMERIC COMPOSITION COMPRISING A THERMOPLASTIC ELASTOMER COMPRISING UNITS DERIVED FROM DIPHENYLENE ETHER MONOMER

(71) Applicant: COMPAGNIE GENERALE DES ETABLISSEMENTS MICHELIN, Clermont-Ferrand (FR)

(72) Inventors: Jean Coue, Clermont-Ferrand (FR); Stephanie Laube, Clermont-Ferrand (FR); Romain Libert, Clermont-Ferrand (FR); Garry Vegi, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 770 days.

(21) Appl. No.: 17/413,222

(22) PCT Filed: Dec. 9, 2019

(86) PCT No.: PCT/EP2019/084205
§ 371 (c)(1),
(2) Date: Jun. 11, 2021

(87) PCT Pub. No.: WO2020/120390
PCT Pub. Date: Jun. 18, 2020

(65) Prior Publication Data
US 2022/0017676 A1    Jan. 20, 2022

(30) Foreign Application Priority Data

Dec. 14, 2018 (FR) ...................... 1872934

(51) Int. Cl.
*C08F 297/04* (2006.01)
*B60C 1/00* (2006.01)
*C08L 25/10* (2006.01)

(52) U.S. Cl.
CPC ........ *C08F 297/046* (2013.01); *B60C 1/0016* (2013.01)

(58) Field of Classification Search
CPC ....... C08F 297/046; C08L 25/10; C08L 53/02
See application file for complete search history.

(56) References Cited

U.S. PATENT DOCUMENTS

| | | |
|---|---|---|
| 3,045,638 A | 7/1962 | Davio |
| 3,448,176 A | 6/1969 | Balas |
| 7,250,463 B2 | 7/2007 | Durel et al. |
| 9,416,212 B1 * | 8/2016 | Dos Santos Freire ...................... B60C 1/0016 |
| 2005/0004297 A1 | 1/2005 | Durel et al. |
| 2017/0313130 A1 | 11/2017 | Chouvel et al. |
| 2018/0105691 A1 * | 4/2018 | Inagaki ................. C08L 71/123 |
| 2020/0190375 A1 * | 6/2020 | Muyldermans ....... C08F 297/04 |

FOREIGN PATENT DOCUMENTS

| | | |
|---|---|---|
| FR | 3022912 A1 | 1/2016 |
| WO | 03/16387 A1 | 2/2003 |
| WO | 2016/142388 A1 | 9/2016 |

OTHER PUBLICATIONS

P.S. Tucker, et al., "Thermal, Mechanical, and Morphological Analyses of Poly(2,6-dimethyl-1,4-phenylene oxide)/Styrene-Butadiene-Styrene Blends", Macromolecules 1988, 21, 1678-1685.
International Search Report dated Feb. 19, 2020, in corresponding PCT/EP2019/084205 (4 pages).

* cited by examiner

*Primary Examiner* — Karuna P Reddy
(74) *Attorney, Agent, or Firm* — VENABLE LLP

(57) ABSTRACT

A tire comprises a polymeric composition comprising at least one block thermoplastic elastomer comprising at least one elastomer block and at least one thermoplastic block, in which each elastomer block comprises at least 70% by weight of units resulting from isoprene, with respect to the weight of said elastomer block, and at least one thermoplastic block comprises 40% to 80% by weight of units resulting from one or more styrenic monomers and 10% to 63% by weight of units resulting from diphenylethylene, with respect to the weight of said thermoplastic block.

7 Claims, No Drawings

TIRE COMPRISING A POLYMERIC COMPOSITION COMPRISING A THERMOPLASTIC ELASTOMER COMPRISING UNITS DERIVED FROM DIPHENYLENE ETHER MONOMER

BACKGROUND

The present invention relates to a tyre comprising a polymeric composition comprising one or more thermoplastic elastomers comprising isoprene blocks and blocks based on styrenic and diphenylethylene monomers, as well as to a tyre comprising layers or plies formed from such a composition, it being possible for said layers or plies to be in particular all or part of a tread.

In a conventional tyre, the tread generally comprises, predominantly by weight, one or more diene elastomers.

A constant aim of tyre manufacturers is to improve the wet grip of tyres. At the same time, another aim is to reduce the rolling resistance of tyres. However, these two aims are difficult to reconcile in that the improvement in grip implies increasing the hysteresis losses whereas the improvement in the rolling resistance implies lowering the hysteresis losses. There is therefore a compromise in performance to be optimized.

To this end, the Applicant Companies have previously developed tyres provided with a tread comprising a thermoplastic elastomer. These tyres exhibit a very good compromise in grip and rolling resistance performance.

In order to further improve these tyres, the stiffness at ambient temperature of the treads can be further improved.

Furthermore, treads made of thermoplastic elastomers are easier to process due to a low viscosity at temperature.

However, on the finished tyre, it may be that the low stiffness at high temperature desired for the processing is then a problem for the performance of the tyre, in particular during use at high temperature. Specifically, during tyre use cycles, such as braking cycles, this may result, in extreme cases, in a softening of the tread which would have the consequence of reducing the endurance of the tread.

Thus, the temperature resistance performances of treads may still be improved.

Consequently, there is a need to improve the temperature resistance of treads made of thermoplastic elastomers, that is to say to limit the drop in stiffness when the temperature increases, without damaging the processing possibilities of these treads.

Furthermore, it is advantageous for the tread to exhibit good mechanical properties, in particular in terms of stiffness, for a given elongation at break.

The Applicant Company has now discovered that the use, in a polymeric composition of a tyre, of a block thermoplastic elastomer comprising at least one elastomer block and at least one thermoplastic block, in which each elastomer block comprises at least 70% by weight of units resulting from isoprene, with respect to the weight of said elastomer block, and at least one thermoplastic block comprises 40% to 80% by weight of units resulting from one or more styrenic monomers and 10% to 63% by weight of units resulting from diphenylethylene, with respect to the weight of said thermoplastic block, makes it possible to solve the above problems and in particular to obtain a tyre exhibiting a low rolling resistance, a suitable stiffness at low temperature and which exhibits a limited drop at high temperature.

SUMMARY

A subject-matter of the invention is thus a tyre comprising a polymeric composition comprising at least one block thermoplastic elastomer comprising at least one elastomer block and at least one thermoplastic block, in which each elastomer block comprises at least 70% by weight of units resulting from isoprene, with respect to the weight of said elastomer block, and at least one thermoplastic block comprises 40% to 80% by weight of units resulting from one or more styrenic monomers and 10% to 63% by weight of units resulting from diphenylethylene, with respect to the weight of said thermoplastic block.

DETAILED DESCRIPTION

In the present description, unless expressly indicated otherwise, all the percentages (%) indicated are percentages by weight.

Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the present patent application, "part per hundred of elastomer" or "phr" is understood to mean the part by weight of a constituent per 100 parts by weight of the elastomer(s), that is to say of the total weight of the elastomer(s), whether they are thermoplastic or non-thermoplastic, of the composition. Thus, a constituent at 60 phr will mean, for example, 60 g of this constituent per 100 g of elastomer.

Thermoplastic elastomer (TPE) is understood to mean, in a known way, a polymer with a structure which is intermediate between a thermoplastic polymer and an elastomer.

A thermoplastic elastomer is constituted by one or more rigid "thermoplastic" segments connected to one or more flexible "elastomer" segments.

Thus, the thermoplastic elastomer(s) of the polymeric composition of the tyre according to the invention comprise at least one elastomer block and at least one thermoplastic block.

Typically, each of these segments or blocks contains at least more than 5, generally more than 10, base units.

In the present patent application, when reference is made to the glass transition temperature of a thermoplastic elastomer, it is the glass transition temperature relating to the elastomer block (unless otherwise indicated). This is because, in a known way, thermoplastic elastomers exhibit two glass transition temperature (Tmg, measured according to ASTM D3418) peaks, the lowest temperature being relative to the elastomer part of the thermoplastic elastomer and the highest temperature being relative to the thermoplastic part of the thermoplastic elastomer. Thus, the flexible blocks of the thermoplastic elastomers are generally defined by a Tg of less than or equal to ambient temperature (25° C.), while the rigid blocks have a Tg of greater than or equal to 80° C. In order to be both elastomeric and thermoplastic in nature, the thermoplastic elastomer has to be provided with blocks which are sufficiently incompatible (that is to say, different as a result of their respective weights, their respective polarities or their respective Tg values) to retain their own properties of elastomer block or thermoplastic block.

Thus, the thermoplastic elastomer(s) which can be used according to the invention (therefore the elastomer block(s) of the thermoplastic elastomers) preferentially exhibit a glass transition temperature which is less than or equal to 25° C., more preferentially less than or equal to 10° C. A Tg value greater than these minima may reduce the performances of the tread during use at very low temperature; for such a use, the glass transition temperature of the thermoplastic elastomers is more preferentially still less than or equal to −10° C.

Also preferably, the glass transition temperature of the thermoplastic elastomers which can be used according to the invention is greater than −100° C.

The number-average molecular weight (denoted Mn) of the thermoplastic elastomers is preferentially between 30 000 and 500 000 g/mol, more preferentially between 40 000 and 400 000 g/mol. Below the minima indicated, there is a risk of the cohesion between the elastomer chains of the thermoplastic elastomers being affected, in particular due to their possible dilution (in the presence of an extender oil); furthermore, there is a risk of an increase in the working temperature affecting the mechanical properties, in particular the properties at break, with the consequence of a reduced "hot" performance. Furthermore, an excessively high weight Mn can be detrimental to the processing. Thus, it has been found that a value of between 50 000 and 300 000 g/mol was particularly well suited to use of the thermoplastic elastomers in a tyre tread.

The number-average molecular weight (Mn) of the thermoplastic elastomers is determined in a known way, by size exclusion chromatography (SEC). The sample is dissolved beforehand in a suitable solvent at a concentration of approximately 2 g/l and then the solution is filtered through a filter with a porosity of 0.45 μm before injection. The apparatus used is a Waters Alliance chromatographic line. The injected volume of the solution of the polymer sample is 100 μl. The detector is a Waters 2410 differential refractometer and its associated software, for making use of the chromatographic data, is the Empower system. The conditions can be adjusted by a person skilled in the art. For example, in the case of TPEs of COPE type, the elution solvent is hexafluoroisopropanol with sodium trifluoroacetate salt at a concentration of 0.02M, the flow rate is 0.5 ml/min, the temperature of the system is 35° C. and the analytical time is 90 min. Use is made of a set of three Phenomenex columns in series, with Phenogel commercial names (pore sizes: $10^5$, $10^4$, $10^3$ A). For example, in the case of thermoplastic styrenic elastomers, the sample is dissolved beforehand in tetrahydrofuran at a concentration of approximately 1 g/l and then the solution is filtered through a filter with a porosity of 0.45 μm before injection. The apparatus used is a Waters Alliance chromatographic line. The elution solvent is tetrahydrofuran, the flow rate is 0.7 ml/min, the temperature of the system is 35° C. and the analytical time is 90 min. A set of four Waters columns in series, with Styragel commercial names (HMW7, HMW6E and two HT6E), is used. The injected volume of the solution of the polymer sample is 100 μl. The detector is a Waters 2410 differential refractometer and its associated software, for making use of the chromatographic data, is the Waters Millennium system. The calculated average molar masses are relative to a calibration curve produced with polystyrene standards.

The polydispersity index (PI=Mw/Mn, with Mw the weight-average molecular weight) of the thermoplastic elastomer(s) is preferably less than 3, more preferentially less than 2 and more preferentially still less than 1.5.

The thermoplastic elastomers which can be used according to the invention can be copolymers with a small number of blocks (less than 5, typically 2 or 3), in which case these blocks preferably have high weights of greater than 15 000 g/mol.

The thermoplastic elastomers can also be copolymers with a large number of smaller blocks (more than 30, typically from 50 to 500), in which case these blocks preferably have relatively low weights, for example from 500 to 5000 g/mol; these thermoplastic elastomers will subsequently be referred to as multiblock thermoplastic elastomers.

According to a first alternative form, the thermoplastic elastomers which can be used according to the invention are provided in a linear form.

In a first specific mode of this first alternative form, the thermoplastic elastomers are diblock copolymers: thermoplastic block/elastomer block.

In a second specific mode of this first alternative form, the thermoplastic elastomers are triblock copolymers: thermoplastic block/elastomer block/thermoplastic block, that is to say a central elastomer block and a terminal thermoplastic block at each of the two ends of the elastomer block.

In a third specific mode of this first alternative form, the thermoplastic elastomers are formed of a linear series of elastomer blocks and of thermoplastic blocks (multiblock thermoplastic elastomers).

According to a second alternative form, the thermoplastic elastomers which can be used according to the invention are provided in a star-branched form comprising at least three branches.

For example, the thermoplastic elastomers can then be composed of a star-branched elastomer block comprising at least three branches and of a thermoplastic block located at the end of each of the branches of the elastomer block. The number of branches of the central elastomer can vary, for example, from 3 to 12 and preferably from 3 to 6.

According to a third alternative form, the thermoplastic elastomers which can be used according to the invention are provided in a branched or dendrimer form. The thermoplastic elastomers can then be composed of a branched or dendrimer elastomer block and of a thermoplastic block located at the end of the branches of the dendrimer elastomer block.

As explained above, the polymeric composition of the tyre according to the invention comprises at least one block thermoplastic elastomer comprising at least one elastomer block. Each elastomer block comprises at least 70% by weight of units resulting from isoprene, with respect to the weight of said elastomer block.

Preferably, the block thermoplastic elastomer comprises at least one elastomer block additionally comprising units resulting from styrenic monomers.

In this case, preferably, the units resulting from styrenic monomers in said elastomer block represent 10% to 20% by weight of the elastomer block.

According to a first embodiment, the thermoplastic elastomer comprises at least one elastomer block formed of units resulting from isoprene and of units resulting from one or more styrenic monomers.

According to a second embodiment, the thermoplastic elastomer comprises at least one elastomer block formed of units resulting from isoprene.

In particular, the thermoplastic elastomer comprises at least one elastomer block formed of units resulting from isoprene and at least one elastomer block formed of units resulting from isoprene and of units resulting from one or more styrenic monomers.

As explained above, the thermoplastic elastomer used according to the invention comprises at least one thermoplastic block.

Thermoplastic block is understood to mean a block formed of polymerized monomers and having a glass transition temperature, or a melting point in the case of semicrystalline polymers, of greater than or equal to 80° C., preferably varying from 80° C. to 250° C., more preferentially varying from 80° C. to 200° C. and in particular varying from 80° C. to 180° C.

This is because, in the case of a semicrystalline polymer, a melting point greater than the glass transition temperature may be observed. In this case, the melting point and not the glass transition temperature is taken into account for the above definition.

In the block thermoplastic elastomer which can be used according to the invention, at least one thermoplastic block comprises 40% to 80% by weight of units resulting from one or more styrenic monomers and 10% to 63% by weight of units resulting from diphenylethylene, with respect to the weight of said thermoplastic block.

According to a preferred embodiment, each thermoplastic block of the thermoplastic elastomer which can be used according to the invention comprises 40% to 80% by weight of units resulting from one or more styrenic monomers and 10% to 63% by weight of units resulting from diphenylethylene, with respect to the weight of said thermoplastic block.

Preferably, said thermoplastic block comprises 65% to 80% by weight of units resulting from one or more styrenic monomers and 20% to 35% by weight of units resulting from diphenylethylene, with respect to the weight of said thermoplastic block.

The styrenic monomers which can be used in the elastomer block and in the thermoplastic block can be chosen from styrene, o-, m- or p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-, m- or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-, m- or p-butylstyrene, o-, m- or p-methoxystyrene, o-, m- or p-chloromethylstyrene, o-, m- or p-bromomethylstyrene, or styrene derivatives substituted by a silyl group.

Preferably, the styrenic monomer is styrene.

Preferably, for the invention, the elastomer blocks of the thermoplastic elastomers exhibit, in total, a number-average molecular weight (Mn) ranging from 25 000 g/mol to 350 000 g/mol, preferably from 35 000 g/mol to 250 000 g/mol, so as to confer, on the thermoplastic elastomers, good elastomeric properties and a mechanical strength which is sufficient and compatible with the use as tyre tread.

Preferably, the thermoplastic blocks of the thermoplastic elastomers exhibit, in total, a number-average molecular weight (Mn) ranging from 5000 g/mol to 150 000 g/mol, so as to confer, on the thermoplastic elastomers, good elastomeric properties and a mechanical strength which is sufficient and compatible with the use as tyre tread.

The thermoplastic block(s) are preferentially present in sufficient proportions to preserve the thermoplastic nature of the thermoplastic elastomers which can be used according to the invention. The minimum content of thermoplastic blocks in the thermoplastic elastomers can vary as a function of the conditions of use of the thermoplastic elastomers.

On the other hand, the ability of the thermoplastic elastomers to deform during the preparation of the tyre can also contribute to determining the proportion of the thermoplastic blocks in the thermoplastic elastomers which can be used according to the invention.

The thermoplastic elastomer which can be used in the polymeric composition of the tyre according to the invention generally represents from 15 to 100 phr of the polymeric composition, preferably from 50 to 100 phr, more preferentially from 70 to 100 phr.

The thermoplastic elastomer which can be used in the polymeric composition of the tyre according to the invention can be prepared by the synthesis process as described below.

The thermoplastic elastomer which can be used in the present invention is prepared by anionic polymerization using known techniques. The polymerization initiator is generally an organometallic compound, such as organolithium compounds, for example ethyl, propyl, isopropyl, n-butyl, sec-butyl, tert-butyl, phenyl, hexylbiphenyl, hexamethylenediediol, butadienyl-, isoprenyl, 1,1-diphenylhexyllithium or polystyryllithium. The amount of initiator required is calculated on the basis of the molecular weight to be achieved, generally from 0.002 mol % to 5 mol %, on the basis of the amount of monomer to be polymerized. The appropriate solvents comprise aliphatic, cycloaliphatic or aromatic hydrocarbons having from 4 to 12 carbon atoms, such as pentane, hexane, heptane, cyclopentane, cyclohexane, methylcyclohexane, decalin, isooctane, benzene, alkylbenzenes, such as toluene, xylene or ethylbenzene, or appropriate mixtures. Polymer chain termination is accomplished by using a coupling agent, such as bi- or polyfunctional compounds, for example divinylbenzene, aliphatic or araliphatic hydrocarbon halides, such as 1,2-dibromoethane, bis(chloromethyl)benzene or silicon tetrachloride, dialkylated) or diarylsilicon dichloride, alkyl- or arylsilicon trichloride, tin tetrachloride, alkylsilicon methoxides, alkylsilicon ethoxides, polyfunctional aldehydes, such as terephthaldehyde, ketones, esters, esters, anhydrides or epoxides. For hydrogenated block copolymers, it is preferable to use 1,2-dibromoethane or diepoxides, in particular diglycidyl ethers, such as 1,4-butanediol diglycidyl ether.

If desired, a Lewis base additive, which affects the polymerization parameters, can also be used. Examples of Lewis bases comprise dimethyl ether, diethyl ether, ethylene glycol dimethyl ether, 1,2-diethoxypropane, diethylene glycol dimethyl ether, tetrahydrofuran, tetrahydrofuryl ethers, such as tetrahydrofurfuryl methyl ether, and tertiary amines.

The hydrogenation of the vinyl groups present in the thermoplastic elastomer can be carried out under conditions such that at least 80 mol %, at least 90 mol % or at least 98 mol % of the vinyl groups are reduced and that 0 mol % to 10 mol % of the arene double bonds are reduced. An appropriate catalyst based on nickel, cobalt or titanium is used in the hydrogenation stage.

The polymeric composition used in the tyre according to the invention can comprise one or more other thermoplastic elastomers different from the thermoplastic elastomer defined above.

The polymeric composition used in the tyre according to the invention can also comprise one or more non-thermoplastic elastomers, such as diene elastomers, well known to a person skilled in the art.

Particularly preferably, the thermoplastic elastomer(s) which can be used according to the invention and described above are the only elastomers of the polymeric composition of the tyre according to the invention.

The polymeric composition which can be used in the tyre according to the invention can also comprise a crosslinking system.

Preferably, the crosslinking system is based on sulfur or on a sulfur donor.

The expression "crosslinking system based on" should be understood as meaning that the crosslinking system comprises a mixture and/or the reaction product of the various constituents used in the crosslinking system, and in particular the sulfur or the sulfur donor, some of these base constituents being capable of reacting, or intended to react, at least in part, with one another or with the other constituents of the composition of the tyre during the various phases of manufacture of the composition of the tyre.

The crosslinking system can be a vulcanization system. In this case, it is preferentially based on sulfur or based on a sulfur donor and on a vulcanization accelerator, in particular a primary vulcanization accelerator.

Mention may be made, among sulfur donors, for example, of alkylphenol disulfides (APDSs), such as, for example, para-(tert-butyl)phenol disulfide.

Advantageously, the content of sulfur or of sulfur donor is between 0.5 and 2 phr, preferably between 0.5 and 1.5 phr, more preferably between 0.5 and 1.4 phr.

Use may be made, as primary accelerator, of any compound capable of acting as accelerator for the vulcanization of diene elastomers in the presence of sulfur, in particular accelerators of the thiazole type, and also their derivatives, or accelerators of thiuram or zinc dithiocarbamate type. These accelerators are more preferentially selected from the group consisting of N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenamide (abbreviated to "TB SI"), zinc dibenzyldithiocarbamate (abbreviated to "ZBEC") and the mixtures of these compounds.

Preferably, use is made of a primary accelerator of the sulfenamide type.

Particularly preferably, the primary vulcanization accelerator is N-cyclohexyl-2-benzothiazolesulfenamide (CBS).

According to a specific embodiment of the invention, the content of vulcanization accelerator(s) varies from 0.2 to 10 phr, preferably varies from 0.2 to 7 phr and more preferentially from 0.6 to 2 phr.

Advantageously, the sulfur or sulfur donor/vulcanization accelerator ratio by weight varies from 0.25 to 4.

Additional to this vulcanization system are optionally various known secondary vulcanization accelerators or vulcanization activators, such as zinc oxide, stearic acid, guanidine derivatives (in particular diphenylguanidine), and the like.

The polymeric composition which can be used according to the invention can also comprise a reinforcing filler.

In particular, use may be made of any type of filler commonly used for the manufacture of tyres, for example an organic filler, such as carbon black, an inorganic filler, such as silica, or also a blend of these two types of filler, especially a blend of carbon black and silica.

Any carbon black conventionally used in tyres ("tyre-grade" blacks) is suitable as carbon blacks. Mention will more particularly be made, for example, of the reinforcing carbon blacks of the 100, 200 or 300 series (ASTI grades), such as, for example, the N115, N134, N234, N326, N330, N339, N347 or N375 blacks, or also, depending on the applications targeted, the blacks of higher series (for example N660, N683 or N772), indeed even N990.

"Reinforcing inorganic filler" should be understood as meaning, in the present patent application, by definition, any inorganic or mineral filler, whatever its colour and its origin (natural or synthetic), also referred to as "white filler", "clear filler", indeed even "non-black filler", in contrast to carbon black, capable of reinforcing, by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of microbeads, of granules, of beads or any other appropriate densified form. Of course, "reinforcing inorganic filler" is also understood to mean mixtures of different reinforcing inorganic fillers, in particular of highly dispersible siliceous and/or aluminous fillers such as described below.

Mineral fillers of the siliceous type, in particular silica ($SiO_2$), or of the aluminous type, in particular alumina ($Al_2O_3$), are especially suitable as reinforcing inorganic fillers. The silica used can be any reinforcing silica known to those skilled in the art, in particular any precipitated or fumed silica exhibiting a BET surface and also a CTAB specific surface both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

In order to couple the reinforcing inorganic filler to the elastomer, it is possible, for example, to use, in a known way, an at least bifunctional coupling agent (or bonding agent) intended to provide a satisfactory connection, of chemical and/or physical nature, between the inorganic filler (surface of its particles) and the elastomer, in particular bifunctional organosilanes or polyorganosiloxanes.

The content by volume of optional reinforcing filler in the polymeric composition (carbon black and/or reinforcing inorganic filler, such as silica) is within a range extending from 0% to 30%, which corresponds approximately to a content of 0 to 100 phr for a plasticizer-free polymeric composition. Preferentially, the polymeric composition which can be used according to the invention comprises less than 30 phr of reinforcing filler and more preferentially less than 10 phr.

According to a preferential alternative form of the invention, the polymeric composition does not contain a reinforcing filler.

In the same way, the polymeric composition which can be used according to the invention can contain one or more inert micrometric fillers, such as the lamellar fillers known to a person skilled in the art.

Preferably, the polymeric composition which can be used according to the invention does not contain a micrometric filler.

The thermoplastic elastomer(s) described above are sufficient by themselves alone for the polymeric composition according to the invention to be usable.

However, according to a preferential embodiment of the invention, the polymeric composition can also comprise at least one plasticizing agent, such as an oil (or plasticizing oil or extender oil) or a plasticizing resin, the function of which is to facilitate the processing of the polymeric composition, particularly its incorporation in the tyre, by a fall in the modulus and an increase in the tackifying power.

Use may be made of any plasticizing oil, preferably having a weakly polar nature, capable of extending or plasticizing elastomers, in particular thermoplastic elastomers. At ambient temperature (23° C.), these oils, which are more or less viscous, are liquids (that is to say, as a reminder, substances which have the ability to eventually assume the shape of their container), in contrast in particular to resins or rubbers, which are by nature solids. Use may also be made of any type of plasticizing resin known to a person skilled in the art.

For example, the extender oil is selected from the group consisting of paraffinic oils, such as a low viscosity paraffinic oil (LVPO).

Thus, in a specific mode of the present invention, the at least one plasticizing agent is a paraffinic oil.

A person skilled in the art will know, in the light of the description and of the implementational examples which follow, to adjust the amount of plasticizer as a function of the thermoplastic elastomers used (as indicated above); of the specific conditions of use of the tyre provided with the polymeric composition.

When it is used, it is preferred for the content of extender oil to be within a range varying from 0 to 80 phr, preferentially from 0 to 50 phr, more preferentially from 5 to 50 phr, depending on the glass transition temperature and the modulus which are targeted for the polymeric composition.

The polymeric composition described above can moreover comprise the various additives usually present in the treads known to a person skilled in the art. The choice will be made, for example, of one or more additives chosen from protective agents, such as antioxidants or antiozonants, UV stabilizers, various processing aids or other stabilizers, or also promoters capable of promoting the adhesion to the remainder of the structure of the tyre.

Preferentially, the polymeric composition does not contain all these additives at the same time and more preferentially still the polymeric composition does not contain any of these agents/aids.

In addition to the elastomers described above, the composition of the polymeric composition might also comprise, always according to a minor fraction by weight with respect to the thermoplastic elastomers, polymers other than elastomers, such as, for example, thermoplastic polymers. When they are present in the polymeric composition, it is preferable for the total content of non-elastomeric thermoplastic polymers to be less than 40 phr, preferentially between 5 and 30 phr and more preferentially between 10 and 25 phr.

These thermoplastic polymers can in particular be poly (para-phenylene ether) polymers (denoted by the abbreviation "PPE"). These PPE thermoplastic polymers are well known to a person skilled in the art; they are resins which are solid at ambient temperature (20° C.) and are compatible with styrenic polymers, which resins are in particular used to increase the glass transition temperature of thermoplastic elastomers, the thermoplastic block of which is a styrenic block (see, for example, "Thermal, Mechanical and Morphological Analyses of Poly(2,6-dimethyl-1,4-phenylene oxide)/Styrene-Butadiene-Styrene Blends", Tucker, Barlow and Paul, Macromolecules, 1988, 21, 1678-1685).

The tyre according to the invention generally comprises a tread, the polymeric composition defined above being present in all or part of the tread.

The tread may be fitted to a tyre in a conventional manner, said tyre comprising, in addition to the tread, a crown, two sidewalls and two beads, a carcass reinforcement anchored to the two beads, and a crown reinforcement.

Optionally, the tyre according to the invention can additionally comprise an underlayer or an adhesion layer between the patterned portion of the tread and the crown reinforcement.

In general, the tyre according to the invention is intended to equip motor vehicles of passenger vehicle, SUV ("Sports Utility Vehicle"), two-wheel vehicle (in particular motorcycle) or aircraft type, and also industrial vehicles, such as vans, heavy-duty vehicles and other transportation or handling vehicles.

Heavy-duty vehicles can in particular comprise underground trains, buses and heavy road transport vehicles, such as lorries, tractors or trailers, and off-road vehicles, such as heavy agricultural or construction plant vehicles.

The process for the preparation of a tyre as defined above generally comprises the following stages:
extrusion or co-extrusion of the tread, then
placing the extruded tread on the tyre, then
curing the tyre.

Thus, the tread of the tyre according to the invention is first of all prepared in a conventional way, by incorporation of the various components in a twin-screw extruder, so as to melt the matrix and incorporate all the ingredients, followed by the use of a die which makes it possible to produce the profiled element.

The various components of the tread are in particular the thermoplastic elastomers seen above, which are available, for example, in the form of beads or granules.

The tread is subsequently placed on the tyre.

The tyre is subsequently cured. The tread is then generally patterned in the mold for curing the tyre.

EXAMPLES

The polymers tested are presented in Table 1.
The polymers P6, P7, P5, P1 and P2 are according to the invention.
The polymers P8, ComP5 and ComP4 cannot be used for the invention.

Preparation of the Polymers

Preparation of the Polymer ComP4

The following are successively added to a dried pressure-resistant stainless steel reactor swept with an inert gas (reactor 1): 0.18 l of cyclohexane, 9.05 g of 1,1-diphenylethylene and 74 mg of diethyl ether, which were heated to 50° C. 15 ml of 0.16 mol/l sec-butyllithium were subsequently added, followed by a slow addition of 30.5 g of purified styrene. After two hours, 190 g of the resulting solution were transferred to another dried pressure-resistant stainless steel reactor swept with an inert gas (reactor 2). Reactor 2 contained 1.06 l of dried cyclohexane, 0.37 ml of 1,2-diethoxypropane and 25.5 g of a mixture of 60% by weight of isoprene with 40% by weight of butadiene. 1.5 ml of sec-butyllithium were added to reactor 2, then heated to 50° C. over a few minutes before the addition of the transfer from reactor 1. The other additions to reactor 2: slow addition of more than 30 minutes of 115 g of a mixture of 60% by weight of isoprene with 40% by weight of butadiene and the temperature was allowed to reach 70° C.; one hour later, 15 g of butadiene and, after 1 minute, 6 ml of 0.12 mol/l methyltrimethoxysilane. Finally, 0.1 ml of 2-ethylhexanol was added to the reactor. The resulting coupled and unreactive polymer solution was precipitated from water. The uncoupled arm had a GPC (gel permeation chromatography) of 127 kg/mol and the major entities had a GPC of 388 kg/mol.

Preparation of the Polymer ComP5

The following were successively added to reactor 1: 0.18 l of cyclohexane, 9.0 g of 1,1-diphenylethylene and 78 mg of diethyl ether, which were heated to 50° C. 16 ml of 0.23 mol/l sec-butyllithium were added and 31.3 g of purified styrene were slowly added in the space of 14 minutes. After 90 minutes, 68 g of the resulting solution were transferred to reactor 2. Reactor 2 contained 1.09 l of dried cyclohexane, 0.39 ml of 1,2-diethoxypropane and 8.8 g of a mixture of 60% by weight of isoprene with 40% by weight of butadiene. 1 ml of sec-butyllithium was added to reactor 2, then heated to 50° C. over a few minutes before the addition of the transfer from reactor 1. The other additions to reactor 2: slow addition over 30 minutes of 119 g of a mixture of 60% by weight of isoprene with 40% by weight of butadiene and the temperature was allowed to reach 70° C. Subsequently, the reaction was allowed to continue for 30 minutes. Finally, 38.4 g of styrene were added and, 23 minutes later, the reactive entities were terminated with methanol. The resulting unreactive polymer solution was precipitated from water. The major entities of polymers had a GPC of 184 kg/mol.

Preparation of an Example of Polymer P1

The following were successively added to reactor 1: 0.18 l of cyclohexane, 9.2 g of 1,1-diphenylethylene, 95 mg of diethyl ether and 11 ml of sec-butyllithium (0.17 mol/l), which were heated to 50° C. 31.8 g of styrene were slowly added. After two hours, 147 g of the resulting solution were transferred to reactor 2. Reactor 2 contained 1.10 l of dried cyclohexane, 0.47 ml of 1,2-diethoxypropane and 32.9 g of isoprene. 1.3 ml of sec-butyllithium were added to reactor 2, then heated to 50° C. over a few minutes before the addition of the transfer from reactor 1. The other additions to reactor 2: slow addition over 30 minutes of 119.6 g of isoprene. Finally, 0.67 ml of divinylbenzene was added and the temperature was increased to 70° C. One hour later, 0.23 ml of 2-ethylhexanol was added. The resulting coupled and unreactive polymer solution was precipitated from water. The uncoupled arm had a GPC of 185 kg/mol and the major entities had a GPC of 686 kg/mol.

Preparation of an Example of Polymer P2

The following were sequentially added to reactor 1: 0.20 l of cyclohexane, 9.16 g of 1,1-diphenylethylene, 96 mg of diethyl ether and 12 ml of sec-butyllithium (0.17 mol/l), which were heated to 50° C. 31.8 g of styrene were slowly added, followed by 3.1 g of isoprene (2.5 hours after the start of the reaction). 20 minutes later, 155 g of the resulting solution were transferred to reactor 2. Reactor 2 contained 1.10 l of dried cyclohexane, 0.3 ml of 1,2-diethoxypropane, 23.2 g of styrene and 130.2 g of isoprene. 0.5 ml of sec-butyllithium was added to reactor 2, then heated to 50° C. over a few minutes before the addition of the transfer from reactor 1. After reacting for one hour, 0.72 ml of divinylbenzene was added and the temperature was increased to 70° C., followed 1 hour later with 0.1 ml of methanol. The resulting coupled and unreactive polymer solution was precipitated from water. The uncoupled arm had a GPC of 190 kg/mol and the major entities had a GPC of 1116 kg/mol.

Preparation of the Example of Polymer P3

The following were successively added to reactor 1: 0.18 l of cyclohexane, 9.19 g of 1,1-diphenylethylene, 96 mg of diethyl ether and 12 ml of 0.17 mol/l sec-butyllithium, which were heated to 50° C. 31.7 g of styrene were slowly added in 34 minutes. After 140 minutes, 134 g of the resulting solution were transferred to reactor 2. Reactor 2 contained 1.10 l of dried cyclohexane, 0.47 ml of 1,2-diethoxypropane and 152.4 g of isoprene. 0.5 ml of sec-butyllithium and was subsequently heated to 50° C. over a few minutes before adding the transfer from reactor 1. After 90 minutes, 0.72 ml of divinylbenzene was added and the temperature was increased to 70° C., followed 140 minutes later by 0.10 ml of methanol. The resulting coupled and unreactive polymer solution was precipitated from water. The uncoupled arm had a GPC Mp of 198 kg/mol and the major entities had a GPC Mp of 826 kg/mol.

Preparation of the Exemplary Polymer P5

The following were sequentially added to reactor 1: 0.20 l of cyclohexane, 11.94 g of 1,1-diphenylethylene, 108 mg of diethyl ether and 13 ml of 0.16 mol/l sec-butyllithium, which were heated to 50° C. 27.8 g of styrene were slowly added in 30 minutes. After 140 minutes, 168 g of the resulting solution were transferred to reactor 2. Reactor 2 contained 1.10 l of dried cyclohexane, 0.46 ml of 1,2-diethoxypropane and 150 g of isoprene. 0.5 ml of sec-butyllithium was added to reactor 2, then heated to 50° C. over a few minutes before the addition of the transfer from reactor 1. After 90 minutes, 0.80 ml of divinylbenzene was added and the reaction mixture was heated to 70° C., 150 minutes later with 0.10 ml of methanol. The resulting coupled and unreactive polymer solution was precipitated from water. The uncoupled arm had a GPC of 163 kg/mol and the major entities had a GPC of 794 kg/mol.

Preparation of the Exemplary Polymer P6

The following were sequentially added to reactor 1: 0.20 l of cyclohexane, 9.19 g of 1,1-diphenylethylene, 95 mg of diethyl ether and 10 ml of sec-butyllithium (0.15 mol/l), which were heated to 50° C. 32.2 g of styrene were slowly added in 30 minutes. After two and a half hours, 184 g of the resulting solution were transferred to reactor 2. Reactor 2 contained 1.10 l of dried cyclohexane, 0.30 ml of 1,2-diethoxypropane, 21.3 g of styrene and 115.2 g of isoprene, all heated to 60° C. 0.5 ml of sec-butyllithium was added to reactor 2 over a few minutes before adding the transfer from reactor 1. After 74 minutes, 3.8 g of isoprene were added, followed by 0.70 ml of divinylbenzene, after which the temperature was increased to 70° C. 150 minutes later, 0.10 ml of methanol was added. The resulting coupled and unreactive polymer solution was precipitated from water. The uncoupled arm had a GPC melting point of 191 kg/mol and the major entities had a GPC point of gravity of 922 kg/mol.

Preparation of the Example of Polymer P7

The following were sequentially added to reactor 1: 0.20 l of cyclohexane, 11.96 g of 1,1-diphenylethylene, 86 mg of diethyl ether and 13 ml of 0.16 mol/l sec-butyllithium, which were heated to 50° C. 28.3 g of styrene were slowly added in 30 minutes and reacted for 90 minutes before adding 9.5 g of isoprene. After one hour, 160 g of the resulting solution were transferred to reactor 2. Reactor 2 contained 1.10 l of dried cyclohexane, 0.30 ml of 1,2-diethoxypropane, 21.3 g of styrene and 119.7 g of isoprene, all heated to 60° C. 0.5 ml of sec-butyllithium was added to reactor 2 over a few minutes before adding the transfer from reactor 1. After 80 minutes, 2.8 g of isoprene were added and subsequently divinylbenzene (0.70 ml). The temperature was increased to 70° C. and then 150 minutes later with 0.10 ml of methanol. The resulting coupled and unreactive polymer solution was precipitated from water. The uncoupled arm had a GPC of 167 kg/mol and the major entities had a GPC of 840 kg/mol.

Preparation of the Example of Polymer P8

The following were successively added to reactor 1: 0.24 litre of cyclohexane, 14.5 g of 1,1-diphenylethylene, 133 mg of diethyl ether and 19 ml of 0.16 mol/l sec-butyllithium, all heated to 50° C. 33.9 g of styrene were slowly added in 30 minutes and reacted for 53 minutes before adding 45.4 g of butadiene. The temperature was increased to 70° C. and, after 43 minutes, 283 g of the resulting solution were transferred to reactor 2. Reactor 2 contained 1.0 litre of dried cyclohexane, 0.43 ml of 1,2-diethoxypropane, 22.5 g of styrene and 23.4 g of butadiene, all heated to 50° C. 0.6 ml of sec-butyllithium was added to reactor 2 over a few minutes before adding the transfer from reactor 1. 53.2 g of butadiene are slowly added in the space of 40 minutes. 6 ml of 0.19 mmol/ml methyltrimethoxysilane are added, the temperature is increased to 70° C. and, two and a half hours later, 0.10 ml of methanol is added. The resulting coupled and unreactive polymer solution was precipitated from water. The uncoupled arm had a GPC of 103 kg/mol and the major entities had a GPC of 206 kg/mol.

TABLE 1

| Name | Description | Structure | Degree of branching | Content of DPE in the terminal blocks % w | Weight of the terminal blocks kg/mol |
|---|---|---|---|---|---|
| ComP4 | SIBS with DPE-modified terminal blocks | [(S/DPE23) - B40/I60 -]n | ~3 | 23 | 18 |
| ComP5 | Star-branched SIBS with DPE-modified terminal blocks and PS blocks in the elastomer part | [(S/DPE23) - B40/I60 - S -]n | ~8 | 23 | 11 |
| P1 | SIS having polyisoprene having a vinyl content of 47.6 and DPE-modified terminal blocks | [(S/DPE23) - Iv47.6 -]n | ~3 | 22 | 19 |
| P2 | S-I/S-S with DPE-modified terminal blocks and in the elastomer part polystyrene and polyisoprene having a vinyl content of 29.4 | [(S/DPE22.4) - S15/Iv29.4 -]n | ~8 | 22 | 18 |
| P6 | S-I/S-S with DPE-modified terminal blocks and in the elastomer part polystyrene and polyisoprene having a vinyl content of 33 and polyisoprene having a low vinyl content (9) | [(S/DPE24.5) - Iv9 - Iv33/S15.6 -]n | ~5 | 22 | 21 |
| P7 | S-I/S-S with DPE-modified terminal blocks and in the elastomer part polystyrene and polyisoprene having a vinyl | [(S/DPE30 )- Iv8 - Iv29/S ]n | ~5 | 30 | 15 |

TABLE 1-continued

| Name | Description | Structure | Degree of branching | Content of DPE in the terminal blocks % w | Weight of the terminal blocks kg/mol |
|---|---|---|---|---|---|
| | content of 29 and polyisoprene having a low vinyl content (8) | | | | |
| P5 | SIS having polyisoprene having a vinyl content of 49 and DPE-modified terminal blocks | [(S/DPE30) - Iv49 -]n | ~4 | 30 | 16 |
| P8 | SSBS with DPE-modified terminal blocks and in the elastomeric part a butadiene having a low vinyl content, a butadiene having a high vinyl content (64) and polystyrene | [(S/DPE30) - B - Bv64/ S23 -]n | ~2 | 30 | 14 |

TABLE 1a

| | Linear chain before coupling | | | | |
|---|---|---|---|---|---|
| Name | weight measured by SEC with PS standard | amount of aromatic rings measured by NMR % w | amount of isoprene units measured by NMR % w | amount of butadiene units measured by NMR % w | amount of vinyl units measured by NMR % w |
| ComP4 | 194 | 23 | 60 | 40 | 33 |
| ComP5 | 195 | 30 | 60 | 40 | 39 |
| P1 | 185 | 17 | 100 | 0 | 48 |
| P2 | 189 | 28 | 100 | 0 | 29 |
| P6 | 187 | 31 | 100 | 0 | 32 |
| P7 | 167 | 29 | 100 | 0 | 29 |
| P5 | 163 | 17 | 100 | 0 | 49 |
| P8 | 103 | 37 | 0 | 100 | 44 |

TABLE 1b

| Name | Mn: value of the peak of the maximum of weight measured by SEC with a UV detector and PS standard kg/mol |
|---|---|
| ComP4 | 267 |
| ComP5 | 393 |
| P1 | 383 |
| P2 | 387 |
| P6 | 386 |
| P7 | 344 |
| P5 | 339 |
| P8 | 206 |

Dienic, Pebax 2533 and SIS D1161, which are comparatives, are also used.

Dienic is a mixture having a rubber matrix of SBR type, charged with silica and vulcanized. It also contains plasticizers. The formula of Dienic is given below (in phr).

TABLE 2

| SBR | 100 |
|---|---|
| Silica microbead | 60 |
| Process oil | 2 |
| Tackifying resin | 40 |
| Trimethylquinone | 1 |
| Anti-ozone wax | 2 |
| para-Phenylenediamine | 2.5 |
| Silane | 5 |
| CBS | 1.6 |
| DPG | 1.6 |
| MBTS | 0.7 |
| Sulfur | 1 |
| Stearic acid | 2 |
| ZnO | 1 |

Pebax 2533 is a thermoplastic elastomer having polyether blocks and having polyamide blocks sold by Arkéma.

SIS D1161 is a linear triblock copolymer based on styrene and on isoprene, sold by Kraton under the reference Kraton D1161.

Example 1: Characterization of the Dynamic Properties: Strain Sweep

The dynamic properties G* and G" are measured on a viscosity analyser (Metravib V A4000), according to Standard ASTM D 5992-96. The response of a sample of desired composition (cylindrical test specimen with a thickness of 2 mm and a cross section of 78 mm$^2$), subjected to a simple alternating sinusoidal shear stress, at a frequency of 10 Hz, at a temperature of 40° C. and according to Standard ASTM D 1349-99, is recorded. A peak-to-peak strain amplitude sweep is carried out from 0.1% to 50% (outward cycle) and then from 50% to 1% (return cycle).

Table 3 shows that the stiffnesses of the various TPEs, except that of the Pebax and KD 16-23, are, by comparison with that of the reference Dienic mixture, sufficiently low for their use in a tyre, including if it is necessary to add filler to improve certain properties, such as the abrasion resistance.

TABLE 3

| | Material | | | | | | | | | | |
|---|---|---|---|---|---|---|---|---|---|---|---|
| | Dienic | P6 | P7 | P5 | P8 | P1 | P2 | SISD1161 | Pebax2533 | ComP4 | ComP5 |
| G* (MPa) at 10% shear | 2.2 | 0.7 | 0.6 | 0.7 | 1.6 | 0.6 | 0.6 | 1.1 | 4.3 | 1 | 2.5 |

This stiffness at the right level is accompanied by a low tan δ value, as shown in Table 4, except for SIS D1161. This low hysteresis makes it possible to envisage the addition of a filler while maintaining a rolling resistance which is lowered with respect to that of a tyre using the Dienic-based tread.

TABLE 4

| | Material | | | | | | | | | | |
|---|---|---|---|---|---|---|---|---|---|---|---|
| | Dienic | P6 | P7 | P5 | P8 | P1 | P2 | SISD1161 | Pebax2533 | ComP4 | ComP5 |
| tan δ max | 0.35 | 0.109 | 0.092 | 0.1 | 0.1 | 0.1 | 0.096 | 0.34 | 0.16 | 0.10 | 0.15 |

Example 2: Characterization of the Dynamic Properties: Temperature Sweep

The dynamic properties G* and G" are measured on a viscosity analyser (Metravib V A4000), according to Standard ASTM D 5992-96. The response of a sample of desired composition (cylindrical test specimen with a thickness of 2 mm and a cross section of 78 mm$^2$), subjected to a simple alternating sinusoidal shear stress, at a frequency of 10 Hz, is recorded.

A sweep is carried out from −80° C. to +150° C. at a rate of 1.5°/min at a stress of 0.7 MPa.

Table 5 shows that the polymers KD 17-04, 17-06 and 17-07 have the maximum of their tangent delta peak well positioned with regard to the reference Dienic material. The Pebax has a very specific behaviour with a very slight peak and at too low a temperature. The maximums of the tan δ values of KD 17-12, 16-33 and 16-38 are positioned at a slightly low temperature but formulation work would make it possible to bring them back to a satisfactory value. The SIS might exhibit an advantage but the tangent values observed in the strain sweep experiment disqualify it. KD16-17 and 16-23B have a tangent peak at too low a temperature.

TABLE 5

| | Material | | | | | | | | | | |
|---|---|---|---|---|---|---|---|---|---|---|---|
| | Dienic | P6 | P7 | P5 | P8 | P1 | P2 | SISD1161 | Pebax2533 | ComP4 | ComP5 |
| T of the tan δ max (° C.) | −5 | −5 | −6 | −7 | −18 | −17 | −20 | −48 | −46 | −37 | −36 |

Example 3: Characterization of the Stability of the Modulus with the Temperature The experiment consists in stressing, in dynamic compression on a viscosity analyser (Metravib V A4000), a cylindrical specimen with a diameter of 10 mm and a height of 20 mm with a dynamic amplitude of +/−0.1% and a static compression of 10% at a frequency of 1 Hz. The temperature sweep is carried out starting from ambient temperature (approximately 20° C.) up to 200° C. at a rate of 1° C./min. The results are given in Table 6.

TABLE 6

| | Material | | | | | | | | |
|---|---|---|---|---|---|---|---|---|---|
| P6 | P7 | P5 | P8 | P1 | P2 | SISD1161 | Pebax 2533 | ComP4 | ComP5 |
| T at 50% drop in stiffness | | | | | | | | | |
| 145 | 146 | 160 | 122 | 148 | 155 | 115 | 76 | 140 | 106 |

It is clearly apparent that Pebax 2533, SIS D1161, KD 17-12 and KD 16-23 exhibit an early drop in stiffness, unlike the experimental polymers KD 17-04, 17-06, 17-07, 16-38 and 16-33. In the same way, the drop in stiffness of these materials with the increase in temperature is only very slightly greater than that of Dienic and thus makes possible their use as a tread, with better properties than the usual TPEs, such as Pebax and SIS, known to a person skilled in the art.

In summary, the materials KD17-04, KD17-06, KD17-07, KD16-33 and KD16-38 exhibit the best set of properties for an application at the tread position.

The invention claimed is:

1. A tire comprising a polymeric composition comprising at least one block thermoplastic elastomer comprising at least one elastomer block and at least one thermoplastic block,
   wherein each elastomer block comprises at least 70% by weight of units resulting from isoprene, with respect to a weight of the at least one elastomer block,
   wherein the at least one block thermoplastic elastomer comprises at least one elastomer block further comprising units resulting from styrenic monomers,
   wherein at least one thermoplastic block comprises 65% to 80% by weight of units resulting from one or more styrenic monomers and 20% to 35% by weight of units resulting from diphenylethylene, with respect to a weight of the at least one thermoplastic block, and
   wherein the at least one block thermoplastic elastomer represents 70 to 100 phr of the polymeric composition.

2. The tire according to claim 1, wherein the units resulting from styrenic monomers in the at least one elastomer block represent 10% to 20% by weight of the at least one elastomer block.

3. The tire according to claim 1, wherein the at least one block thermoplastic elastomer comprises at least one elastomer block consisting of units resulting from isoprene and of units resulting from one or more styrenic monomers.

4. The tire according to claim 1, wherein the at least one block thermoplastic elastomer comprises at least one elastomer block consisting of units resulting from isoprene.

5. The tire according to claim 1, wherein the at least one block thermoplastic elastomer comprises at least one elastomer block consisting of units resulting from isoprene and at least one elastomer block consisting of units resulting from isoprene and of units resulting from one or more styrenic monomers.

6. The tire according to claim 1, wherein the one or more styrenic monomers is selected from the group consisting of styrene; o-, m-, or p-methylstyrene; α-methylstyrene; β-methylstyrene; 2,6-dimethylstyrene; 2,4-dimethylstyrene; α-methyl-o-methylstyrene; α-methyl-m-methylstyrene; α-methyl-p-methylstyrene; β-methyl-o-methylstyrene; β-methyl-m-methylstyrene; β-methyl-p-methylstyrene; 2,4,6-trimethylstyrene; α-methyl-2,6-dimethylstyrene; α-methyl-2,4-dimethylstyrene; β-methyl-2,6-dimethylstyrene; β-methyl-2,4-dimethylstyrene; o-, m-, or p-chlorostyrene; 2,6-dichlorostyrene; 2,4-dichlorostyrene; α-chloro-o-chlorostyrene; α-chloro-m-chlorostyrene; α-chloro-p-chlorostyrene; β-chloro-o-chlorostyrene; β-chloro-m-chlorostyrene; β-chloro-p-chlorostyrene; 2,4,6-trichlorostyrene; α-chloro-2,6-dichlorostyrene; α-chloro-2,4-dichlorostyrene; β-chloro-2,6-dichlorostyrene; β-chloro-2,4-dichlorostyrene; o-, m-, or p-butylstyrene; o-, m-, or p-methoxystyrene; o-, m-, or p-chloromethylstyrene; o-, m-, or p-bromomethylstyrene, and styrene derivatives substituted by a silyl group.

7. The tire according to claim 1, wherein the tire comprises a tread, and wherein the polymeric composition is present in all or part of the tread.

* * * * *